US008349378B2

(12) United States Patent
Wasmuht et al.

(10) Patent No.: US 8,349,378 B2
(45) Date of Patent: Jan. 8, 2013

(54) BREWING PROCESS AND BREWERY INSTALLATIONS

(75) Inventors: Klaus-Karl Wasmuht, Ellingen (DE); Cornelia Folz, Berlin (DE)

(73) Assignee: Krones AG, Neutraubling (DE)

( * ) Notice: Subject to any disclaimer, the term of this patent is extended or adjusted under 35 U.S.C. 154(b) by 222 days.

(21) Appl. No.: 12/742,709

(22) PCT Filed: Oct. 28, 2008

(86) PCT No.: PCT/EP2008/009102
§ 371 (c)(1),
(2), (4) Date: Jul. 8, 2010

(87) PCT Pub. No.: WO2009/062597
PCT Pub. Date: May 22, 2009

(65) Prior Publication Data
US 2011/0033585 A1   Feb. 10, 2011

(30) Foreign Application Priority Data

Nov. 13, 2007   (DE) .......................... 10 2007 054 429

(51) Int. Cl.
*C12C 13/00*   (2006.01)

(52) U.S. Cl. .......... 426/11; 426/231; 165/288; 165/293; 165/294; 165/298; 165/300; 165/48.2

(58) Field of Classification Search .................. 426/11, 426/231; 165/287–288, 293–294, 296–298, 165/300, 48.2
See application file for complete search history.

(56) References Cited

U.S. PATENT DOCUMENTS

| 3,236,292 | A | * | 2/1966 | Smith, Jr. ..................... 165/11.1 |
| 3,888,303 | A | * | 6/1975 | Skala ............................. 165/300 |
| 4,173,993 | A | * | 11/1979 | Skala ............................ 165/48.1 |
| 4,527,618 | A | * | 7/1985 | Fyfe et al. ..................... 126/635 |
| 4,814,189 | A | * | 3/1989 | Laude-Bousquet ............ 426/15 |
| 7,069,976 | B2 | * | 7/2006 | Lindgren ..................... 165/11.1 |
| 2009/0148556 | A1 | * | 6/2009 | Stippler et al. ................. 426/16 |

FOREIGN PATENT DOCUMENTS

| DE | 19731351 A1 | 1/1999 |
| DE | 19846364 A1 | 4/2000 |
| DE | 19852057 A1 | 5/2000 |
| DE | 19953493 A1 | 5/2001 |
| DE | 10025318 C1 | 7/2001 |
| DE | 102005013314 A1 | 9/2006 |
| WO | WO-2006100062 A1 | 9/2006 |

OTHER PUBLICATIONS

Written Opinion of the International Searching Authority in regards to PCT/EP2008/009102, date of report issuance is Aug. 31, 2010.

* cited by examiner

*Primary Examiner* — Drew E Becker
(74) *Attorney, Agent, or Firm* — Marshall, Gerstein & Borun LLP

(57) ABSTRACT

A brewing process including taking off a fluid having a starting temperature from a heat store; feeding the fluid to a plurality of heat consumers for releasing heat; and returning to the heat store the fluid which has a final temperature. The brewery installation has a heat store for controlling the flow of the fluid in the installation, and a plurality of heat consumers each of which is connected to the primary circuit for releasing heat. Improved efficiency is achieved in part by the final temperature of the fluid which flows out of the respective heat consumers is measured and the return of the fluid is controlled as a function of the measured final temperature.

8 Claims, 2 Drawing Sheets

BREWING PROCESS AND BREWERY INSTALLATIONS

CROSS-REFERENCE TO RELATED APPLICATION

The present application claims the benefit of priority of International Patent Application No. PCT/EP2008/009102, filed Oct. 28, 2008, which application claims priority of German Application No. 10 2007 054 429.6, filed Nov. 13, 2007. The entire text of the priority application is incorporated herein by reference in its entirety.

FIELD OF THE DISCLOSURE

The present disclosure relates to a brewing process and a brewery installation.

BACKGROUND

The energy costs for example incurred in brewing beer constitute an important proportion of the total production costs of beer. As the proportion of energy costs will probably even increase with the shortage of fossil fuels and the higher energy prices involved, the applicant suggested a brewing process and a brewery installation according to the preamble each of claim 1 and claim 10 in WO 2006/100062 A1.

This generic prior art discloses a brewery installation comprising a solar system to make the brewery more independent of fossil fuel demands. The generic prior art suggests to satisfy at least a portion of the thermal energy demand of heat consumers of the brewery installation from energy not originating from fossil fuels, but from solar collectors converting the energy of solar radiation into thermal energy.

For this, the solar collectors are designed such that the hottest fluid required for the brewing process can be heated to a temperature of at least 120° by solar energy. The thermal energy generated by the solar collectors is, for example, temporarily stored in a high pressure stratified storage that receives fluid. The heated fluid is guided from the upper region of the heat store via a pipe to different heat consumers to which heat is released via heat exchangers. After heat has been released, the fluid has a final temperature and is returned to the heat store via a return pipe.

To increase the efficiency of the heat store, and accordingly of the complete brewery installation, stratified storages in which different temperature zones are formed are known from prior art. The returned fluid is guided into the temperature zone in which the temperature of the fluid located in this temperature zone of the stratified storage approximately corresponds to that of the returned fluid. For this, DE 197 31 351 A1, for example, suggests to dispose an ascending pipe in the stratified storage which extends along the longitudinal axis of the stratified storage. The ascending pipe comprises several openings spaced apart in the longitudinal direction through which the returned fluid can flow into different temperature zones of the stratified storage.

From DE 100 25 318 C1, another stratified storage is known. This known stratified storage comprises a bent distributor pipe in its lower region which is coupled to several ascending pipes. The returned fluid can be either introduced into the stratified storage via an opening of the distributor pipe, or via the ascending pipes connected to the bent distributor pipe.

However, with the stratified storages known from DE 197 31 351 A1 and DE 100 25 318 C1, fluids having different temperatures might get mixed within the stratified storage, resulting in a reduction of the efficiency of the stratified storage and accordingly of a complete brewing process.

SUMMARY OF THE DISCLOSURE

Starting from WO 2006/100062 A1, it is an object of the present disclosure to provide a brewing process and a brewery installation having improved efficiency.

In the present brewing process, the final temperature of the fluid is detected after heat has been released to a heat consumer. The return of the fluid into the heat store is then controlled as a function of the detected final temperature. In the present method, the fluid having a final temperature is then returned as a function of the detected final temperature. The fluid having the final temperature can be fed to a further heat consumer. However, it can also be subjected to reheating. The decision will be made as a function of the detected final temperature, usually by a computer controlling the heat management of the brewery installation.

In the present method, the fluid having the final temperature is then no longer merely statically returned into a stratified storage for heating or storage. As a function of the actually detected final temperature in each case, i.e. the heat removed from the fluid, a decision is rather made on the further path the fluid flowing from the heat consumer is to follow. The corresponding decision is carried out by the host computer in an energy optimizing manner. This permits to release still usable final heat to a second or further consumer. Furthermore, the fluid is preferably subjected to reheating to only such a temperature that leads to a relatively high efficiency during reheating in the heat source. This heat source can be, for example, a solar system.

The control of the fluid as a function of its final temperature correspondingly leads to a brewing process having improved efficiency.

Preferably, the fluid is fed to at least one further heat consumer and/or heat store as a function of the detected final temperature of said fluid flowing out of the heat consumer. Thereby, the fluid having a final temperature can release heat to one or several further heat consumers before it is returned to the heat store. This brings about the advantage that the fluid is used for further releasing heat, after it has released heat to a first heat consumer, whereby the fluid can be finally introduced into the heat store at a temperature as low as possible. Thereby, the heat release of the fluid to the heat consumers is optimized, improving the efficiency of the brewing process.

According to a further development, the fluid is fed into a predetermined region of the heat store as a function of the final temperature. According to this preferred embodiment, it is accordingly detected already before the fluid flows into the heat store which region of the heat store defines a temperature zone that is suited for the fluid, taking into consideration the final temperature of said fluid. According to this preferred embodiment, the fluid is correspondingly not introduced first into the heat store and guided into the suited temperature zone within this heat store, but it is previously fed to a predetermined region of the heat store, so that the fluid can be directly fed into the suited temperature zone, that means without being diverted within the heat store. Thereby, mixing of the different temperature zones of the heat store is effectively prevented.

If the final temperature of the fluid is not suited for releasing heat to a further secondary circuit, the fluid can be mixed with a fluid having a starting temperature, i.e. a fluid which has not yet released any heat after it has flown out of the heat store. Thus, the fluid having a final temperature can be several times branched off from the primary circuit to different secondary circuits, which are usually provided as parallel connection relative to each other with respect to the fluid, until it has a final temperature which is no longer suited for releasing heat to further secondary circuits, even if fluid with a starting temperature is added. The fluid is accordingly optimally utilized and fed to different heat consumers arranged in series in a partial flow until the fluid has the temperature suited for reheating and/or for being returned to the heat store.

According to a further preferred embodiment, the mixing ratio is adjusted with temperature control upstream of a further heat consumer which receives fluid flowing out of an upstream heat exchanger. The initial point of such temperature control can be the inlet temperature the fluid mixed from both partial flows is to have when it enters the further heat consumer. The desired inlet temperature can be controlled by detecting the temperatures of the individual partial flows and adapting the proportions of both partial flows to the total flow of the mixture. Here, too, the signals of the temperature sensors and the position of corresponding mixing valves are preferably processed and/or controlled in an automated manner by a host computer. In the process, the starting temperature is preferably determined directly upstream of the outlet mouth of the fluid having the final temperature to also exactly determine the temperature of the hotter proportion of the flow to be mixed.

In a preferred further development of the mixing process, the fluid in the primary circuit first passes a secondary circuit, of which the inlet temperature into the heat consumer is higher than the inlet temperature in the secondary circuit of the downstream heat consumer. In other words, a series connection of several secondary circuits first guides the fluid carried in the primary circuit to a heat exchanger which receives a fluid to be heated on the secondary side which has a higher temperature than that introduced into the heat exchanger in the downstream heat consumer in the secondary circuit. Here, the further development can be guided by the consideration that with an increasing inlet temperature in the heat exchanger on the side of the secondary circuit, the outlet temperature in the primary circuit increases.

In the present method, an increase of the energetic efficiency can be already achieved by the fluid circulating in the primary circuit being heated by fossil fuels. However, it is preferred to heat the fluid completely or partially by means of solar energy.

With the present system, one aspect of the disclosure concerning the device is achieved. According to the disclosure, at least one temperature sensor is provided downstream of each heat consumer. The temperature sensor is embodied, for example, downstream of the heat consumer in the primary circuit.

As the flow controller unit is coupled to the temperature sensors, the fluid flow can be controlled as a function of the detected final temperature. Accordingly, the fluid having the final temperature can flow through the brewery installation such that it is returned to the heat store at a temperature as low as possible.

To improve the energetic efficiency, the heat store is moreover further developed. Its inlet openings are, for example, embodied to be spaced apart in the longitudinal direction of the heat store. For example, one inlet opening is assigned to a certain zone of the heat store, whereby the fluid flowing back into the heat store is caused to flow into the heat store through one of the inlet openings as a function of the detected final temperature. By embodying the inlet openings at the heat store, the fluid can be fed to a suited temperature zone outside the heat store. A diversion of the fluid within the heat store is not required according to this preferred embodiment. Thereby, intense mixing of the different temperature zones within the heat store is effectively prevented.

Taking into consideration the altogether conceivable temperatures in the primary circuit, it proved advantageous to provide three inlet openings at the heat store, that is one upper, one central and one lower opening, which are located each individually in layers of the heat store having different temperatures.

BRIEF DESCRIPTION OF THE DRAWINGS

Further details, advantages and features of the present disclosure can be taken from the following description of an embodiment in connection with the drawing. In the drawing.

DETAILED DESCRIPTION OF THE PREFERRED EMBODIMENT

The embodiment described below with reference to the drawings only shows a part of a brewery installation and a brewing process. Other details, which are not described more in detail herein, essentially correspond to those described in WO 2006/100062 A1, which can be used in combination with the following preferred embodiment of the present disclosure.

Figure 1:
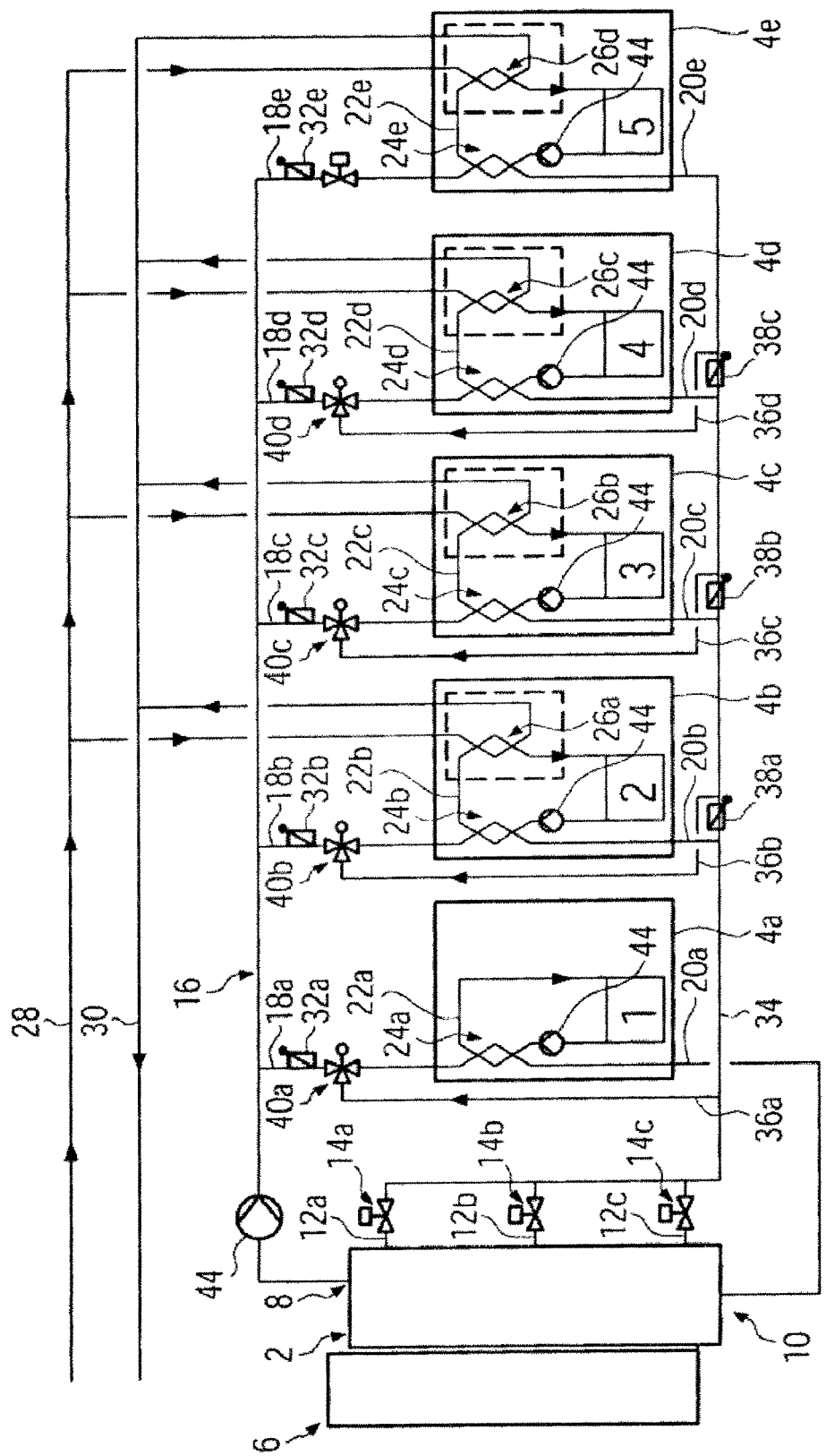
FIG. 1 shows a schematic representation of components of a brewery installation according to a preferred embodiment of the present disclosure.

FIG. 1 schematically shows the connection of a high pressure stratified storage 2 to several heat consumers 4a, 4b, . . . 4e. The first heat consumer 4a is used for heating fresh water. The second heat consumer 4b is the space heating. The third heat consumer 4c corresponds to the brewing water tank. The fourth heat consumer 4d is the hot water tank. The fifth heat consumer 4e is the bottle cleaner of the brewery.

The high pressure stratified storage 2 is coupled to solar collectors 6 as it is described in detail in WO 2006/100062 A1. The connection between the stratified storage 2 and the solar collectors 6 is therefore not illustrated more in detail herein. It is only pointed out that the stratified storage 2 is coupled to the solar collectors 6 such that the water stored in the stratified storage 2 under high pressure is stored at a temperature of at least 120° C., in particular of 140° C. to 180° C. in the liquid phase.

The stratified storage 2 has an upper outlet 8 and a lower inlet 10. Moreover, the stratified storage 2 has three lateral inlet openings 12a, 12b, and 12c. A two-way valve 14a, 14b, 14c is provided in front of each inlet opening 12a, 12b, 12c.

The individual heat consumers 4a to 4e are connected to the stratified storage 2 via a schematically shown primary circuit 16.

The individual heat consumers 4a to 4e are connected each to the primary circuit 16 upstream via feed pipes 18a to 18e and downstream thereof via return pipes 20a to 20e.

Each heat consumer 4a to 4e moreover comprises a secondary circuit 22a to 22e which is thermally coupled to the primary circuit 16 via a heat exchanger 24a to 24e.

The secondary circuits 22b to 22e are moreover coupled to a conventional steam pipe 28 as well as a conventional condensate pipe 30 each by further heat exchangers 26a to 26d.

Upstream of each heat consumer 4a to 4e, temperature sensors are each arranged, for example in the region of non-return valves 32a to 32e.

Downstream of the respective heat consumers 4a to 4e, the return pipes 20b to 20e end in a collecting pipe 34 which is coupled to the inlet openings 12a to 12c. A bridge-over pipe 36d is branched off from the collecting pipe 34 which ends in the feed pipe 18d of the fourth heat consumer 4d. A temperature sensor 38d is assigned to this bridge-over pipe 36d in the region of the junction from the collecting pipe 34. In a similar way, a bridge-over pipe 36b, 36c, and a temperature sensor 38b, 38c are provided each for the second heat consumer 4b and the third heat consumer 4c. The temperature of the primary circuit 16 is measured via these sensors 38a to 38c in the region of the collecting pipe 34 near the transition pipes 36. The first heat consumer 4a, too, is coupled to the collecting pipe 34 via a bridge-over pipe 36a. The respective bridge-over pipes 36a to 36d communicate with the respective feed pipes 18a to 18d via mixing valves 40a to 40d which are arranged downstream of the temperature sensors provided in the feed pipes 18a to 18d. A two-way valve 42 is provided in the feed pipe 18e of the fifth heat consumer 4e.

Different to the heat consumers 4b to 4e, the return line 20a of the first heat consumer 4a does not communicate with the collecting pipe 34, but it communicates directly with the stratified storage 2 via the lower inlet 10.

In the primary circuit 16 as well as in each secondary circuit 22a to 22e, pumps 44 are provided for controlling the flow velocity of the fluid circulating in the respective circuit 16, 22a to 22e.

Figure 2:
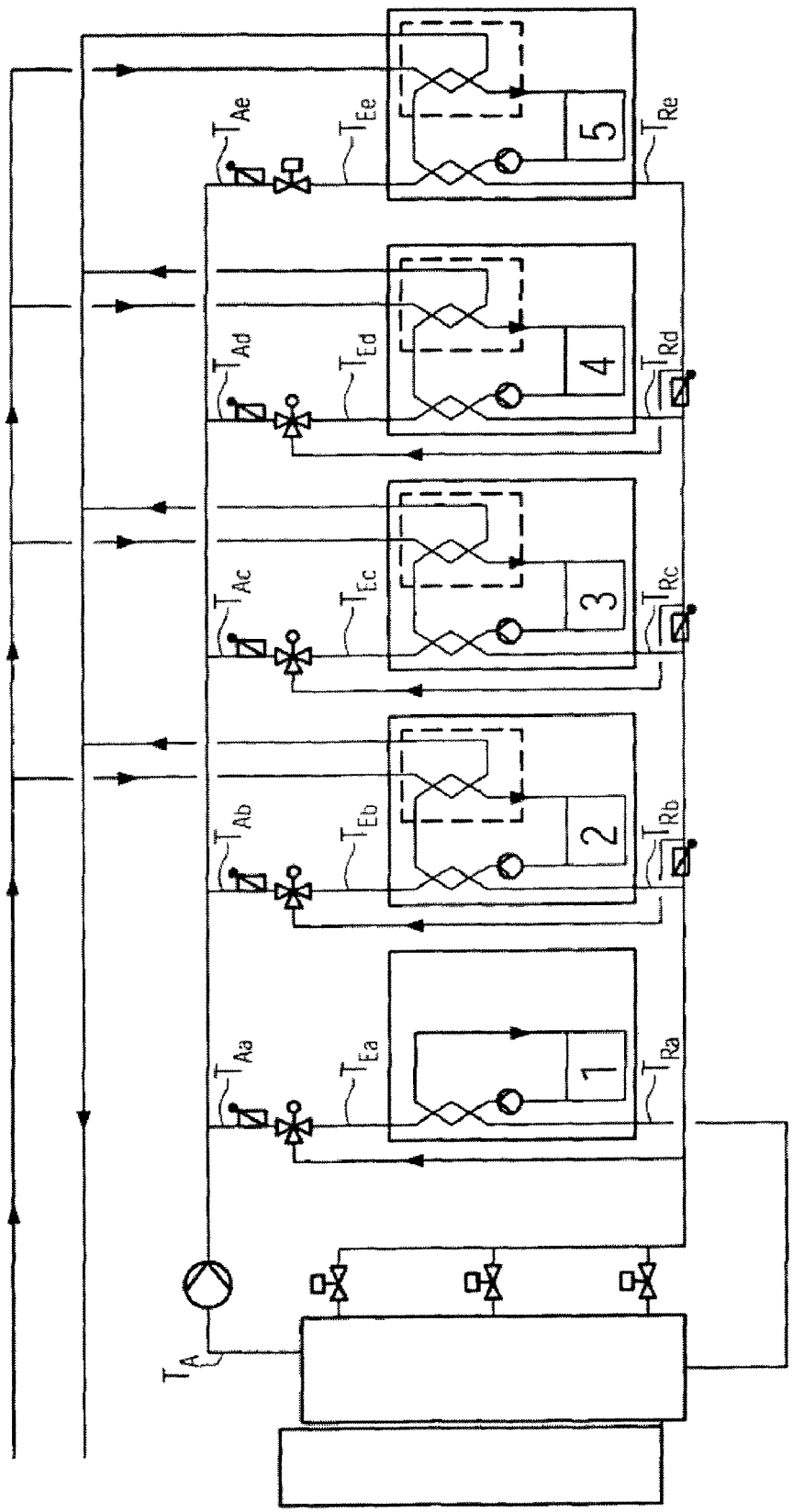
FIG. 2 shows the temperature conditions in the embodiment according to FIG. 1.

Before the function of the brewery installation shown in FIG. 1 will be described in detail, the definition of the different temperature conditions is described with reference to FIG. 2.

The hot water flowing in the primary circuit 16 is taken from the stratified storage 2 at a starting temperature $T_A$. The starting temperature $T_A$ with respect to each heat consumer 4a to 4e is measured upstream of the valves 40a to 40d, 42. The temperature at which the water causes the heat exchange in the respective heat consumer 4a to 4e is hereinafter referred to as inlet temperature $T_E$. The temperature the water has after the heat exchange will be hereinafter referred to as final temperature $T_R$. For example, the final temperature $T_{Rb}$ designates the final temperature of the water downstream of the heat consumer 4b after the heat exchange.

Below, the brewing process will be described with reference to FIGS. 1 and 2.

The hot water having a starting temperature TA is taken from the stratified storage 2 via the primary circuit 16 and fed to the individual heat consumers 4a to 4e to there cause the release of heat. Hot water is fed to each heat consumer 4a to 4e via the respective feed pipes 18a to 18e. The water having an inlet temperature TE releases heat to the heat consumer 4a to 4e via the heat exchanger 24a to 24e of the secondary circuit 22a to 22e. Subsequently, the water has a final temperature $T_R$ and is, as a function of the final temperature $T_R$, either directly returned to the stratified storage 2 or fed to a further heat consumer 4a to 4d. The control of the return of the water will be described below in detail with reference to the fifth heat consumer 4e.

Water flows into the heat consumer 4e with an inlet temperature $T_{Ee}$ and releases heat. After the heat exchange, the water has a final temperature $T_{Re}$. The flow controller unit of the brewery installation detects whether this final temperature $T_{Re}$ is suited for releasing heat to one of the heat consumers 4a to 4d arranged downstream. For this, the final temperature $T_{Re}$ is detected by means of the temperature sensor 38c, and a logic decides whether the water having the final temperature $T_{Re}$ is fed to the fourth heat consumer 4d via the bridge-over pipe 36d. If the final temperature $T_{Re}$ is not suited to there cause a heat exchange in an energetically efficient way, the water is guided further through the collecting pipe 34.

In the region of the bridge-over pipe 36c, the final temperature of the water is measured again by the temperature sensor 38c. If this detected final temperature is suited for the third heat consumer 4c, the water is fed to the heat consumer 4c via the bridge-over pipe 36c of the feed pipe 18c. Accordingly, the water flows via the collecting pipe 34, the bridge-over pipe 36c and the feed pipe 18c to the third heat consumer 4c. Via the mixing valve 40c, the water having a final temperature can be mixed with the water having a starting temperature $T_{Ac}$ to obtain water with the required inlet temperature T. This ensures that water with the required inlet temperature $T_{Ec}$ flows to the third heat consumer 4c for releasing heat.

After heat has been released to the third heat consumer 4c, the water having a final temperature $T_{Rc}$ is fed to the collecting pipe 34 via the return pipe 20c. In the region of the bridge-over pipe 36b of the second heat consumer 4b, the final temperature of the water is detected by the temperature sensor 38a. The detected temperature does not necessarily correspond to the final temperature $T_{Rc}$ as the water having a final temperature $T_{Rc}$ in the collecting pipe 34 can mix with the water having a final temperature $T_{Rd}$ and/or $T_{Re}$. If the water has a final temperature which is suited for causing a release of heat to the second heat consumer 4b, it is fed to the heat consumer 4b via the bridge-over pipe 36b. Here, too, the flow controller unit determines whether the water having a starting temperature $T_{Ab}$, and which quantity of this water, is to be mixed with the water having a final temperature to adjust the required inlet temperature $T_{Eb}$. This mixing ratio is adjusted by means of the mixing valve 40b, if required.

After heat has been released to the second heat consumer 4c, the water having a final, temperature $T_{Rb}$ is returned to the collecting pipe 34. The water is then returned, for example, to the stratified storage 2. In particular, the water is caused to flow into the stratified storage 2 as a function of the final temperature via one of the inlet openings 12a to 12c. Assuming that the water to be introduced into the store 2 has a final temperature $T_{Rb}$ which approximately corresponds to the water temperature in the central region of the stratified storage 2, this water is introduced into the stratified storage 2 via the inlet opening 12b. The water flowing out of the first heat consumer 4a is always fed to the lower region of the stratified storage 2 via the lower inlet 10 as this water is maximally cooled, and the water having the lowest temperature is stored in the lower region of the stratified storage 2.

It follows from the above that the thermal energy transported by the water is optimally utilized before it is returned to the stratified storage 2. Thus, the water is returned to the stratified storage 2 at the lowest temperature.

When the water taken from the stratified storage 2 is fed to the respective heat consumers 4a to 4e, the secondary circuits 22a to 22e are connected in parallel with reference to the primary circuit 16. That means that the heat consumers 4a to 4e are provided as a function of their respective inlet temperatures $T_E$.

However, the secondary circuits 22a to 22e can also be connected in series by the bridge-over pipes 36a to 36d. That means that the water having a final temperature $T_{Re}$ which flows out of the fifth heat consumer 4e can be fed to the heat consumers 4d, 4c, 4b and 4a situated downstream via the respective bridge-over pipes 36d, 36c, 36b and 36a, where in this case the heat consumers 4a to 4e are connected in series by the bridge-over pipes 36a to 36d.

The heat exchange between the conventional steam or condensate pipes 28, 30 with the respective heat consumers 4b, 4c, 4d and 4e corresponds to the heat exchange described in WO 2007/100062 A1 and is therefore not described more in detail herein.

Of course, more than five heat consumers can be coupled to the primary circuit 16. Further examples of heat consumers are disclosed in WO 2006/100062 A1.

It will be understood that the disclosure is not exclusively restricted to applications for brewing beer, but can also be employed in other suited fields, such as food treatment, pharmacy or the like.

The invention claimed is:

1. Brewing process, comprising the steps of:
   taking off a fluid having a starting temperature (TA) from a heat store,
   feeding the fluid to several heat consumers for releasing heat,
   returning the fluid having a final temperature (TR) to the heat store, and
   detecting the final temperature (TR) of the fluid flowing out of the respective heat consumers and controlling the return of the fluid as a function of the detected final temperature (TR), thereby making a decision on the further path the fluid flowing from the heat consumer is to follow and feeding the fluid to at least one further heat consumer and/or to the heat store as a function of the decision made on the detected final temperature (TR) of the fluid flowing out of the heat consumer.

2. Brewing process according to claim 1, and feeding the fluid to a predetermined region of the heat store as a function of the final temperature (TR).

3. Brewing process according to claim 1, and carrying the fluid in a primary circuit and the thermal energy is released via heat exchangers each to a secondary circuit of the respective heat consumers.

4. Brewing process according to claim 3, and guiding the fluid having a starting temperature (TA), after it has released heat to a preceding secondary circuit, to a further secondary circuit downstream of the preceding secondary circuit, via a bridge-over path branched off from the primary circuit.

5. Brewing process according to claim 4, and mixing the fluid having a final temperature (TRe) with the fluid having a starting temperature (TAd) before the release of heat to the further secondary circuit as a function of the final temperature (TRe) and the starting temperature (TAd).

6. Brewing process according to claim 4 and feeding fluid having an inlet temperature (TEd), adjusted by mixing fluid having the final temperature (TRe) with fluid having the starting temperature (TAd), to the further secondary circuit, and determining the starting temperature (TAd) directly upstream in front of the outlet of the fluid having the final temperature (TRe), and adjusting the inlet temperature (TEd) via the mixing ratio as a function of the measured starting temperature (TAd) and the measured final temperature (TRe).

7. Brewing process according to claim 4, wherein the inlet temperature (TEe) into the heat exchanger of the upstream secondary circuit is higher than the inlet temperature (TEd) of the further secondary circuit.

8. Brewing process according to claim 1, and heating the fluid stored in the heat store by means of solar energy.

* * * * *